US 11,418,983 B2

(12) United States Patent
Koudouridis et al.

(10) Patent No.: US 11,418,983 B2
(45) Date of Patent: Aug. 16, 2022

(54) COORDINATOR NETWORK NODE AND ACCESS NETWORK NODES FOR RESOURCE ALLOCATION IN A WIRELESS COMMUNICATION SYSTEM

(71) Applicant: HUAWEI TECHNOLOGIES CO., LTD., Guangdong (CN)

(72) Inventors: George Koudouridis, Kista (SE); James Gross, Kista (SE); Johan Christer Qvarfordt, Kista (SE); Kari Juhani Leppanen, Kista (SE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 78 days.

(21) Appl. No.: 17/084,907

(22) Filed: Oct. 30, 2020

(65) Prior Publication Data

US 2021/0051501 A1 Feb. 18, 2021

Related U.S. Application Data

(63) Continuation of application No. PCT/EP2018/061111, filed on May 2, 2018.

(51) Int. Cl.
*H04W 24/08* (2009.01)
*H04W 72/04* (2009.01)
*H04W 92/04* (2009.01)

(52) U.S. Cl.
CPC ....... *H04W 24/08* (2013.01); *H04W 72/0406* (2013.01); *H04W 92/04* (2013.01)

(58) Field of Classification Search
None
See application file for complete search history.

(56) References Cited

U.S. PATENT DOCUMENTS 9,059,823 B2 6/2015 Lee et al.
9,232,405 B2 1/2016 Dimou et al.
(Continued)

FOREIGN PATENT DOCUMENTS

CN 101690291 A * 3/2010 ............ H04W 16/06
EP 2120475 A1 11/2009
(Continued)

OTHER PUBLICATIONS

3GPP Ts 36.423 V11.2.0 (Sep. 2012),3rd Generation Partnership Project;Technical Specification Group Radio Access Network,Evolved Universal Terrestrial Radio Access Network (E-UTRAN);X2 application protocol (X2AP)(Release 11), total 136 pages.
(Continued)

*Primary Examiner* — Jamaal Henson
(74) *Attorney, Agent, or Firm* — Womble Bond Dickinson (US) LLP (57) ABSTRACT

Embodiments of the disclosure relate to a coordinator network node and one or more network access nodes interworking in a wireless communication system. The coordinator network node determines a joint resource allocation area ($\Omega_{UE}$) based on measurement messages from network access nodes. The determined joint resource allocation area ($\Omega_{UE}$) is thereafter transmitted to the network access nodes. Thereby, the coordinator network node enables to determine the portion of the first or the second service areas that are free from interference from neighbouring network access nodes where each network access node can perform resource allocations independently. It further enables to determine/identify the joint resource allocation area where neighbouring network access nodes significantly interfere each other. Therefore, e.g. resource allocation in the system can be improved. Furthermore, the disclosure also relates to corresponding methods and a computer program.

16 Claims, 6 Drawing Sheets

(56) References Cited

U.S. PATENT DOCUMENTS

| | | | |
|---|---|---|---|
| 2004/0203880 A1* | 10/2004 | Riley | G01S 5/14 |
| | | | 455/67.11 |
| 2011/0117967 A1 | 5/2011 | Vedantham et al. | |
| 2013/0109405 A1* | 5/2013 | Siomina | G01S 5/017 |
| | | | 455/456.1 |
| 2013/0286954 A1* | 10/2013 | Ma | H04B 7/024 |
| | | | 370/328 |
| 2014/0056282 A1 | 2/2014 | Sun et al. | |
| 2015/0351106 A1* | 12/2015 | Wijetunge | H04W 72/1226 |
| | | | 370/329 |
| 2016/0037301 A1 | 2/2016 | Davydov et al. | |
| 2016/0037541 A1* | 2/2016 | Kim | H04B 7/0626 |
| | | | 370/329 |
| 2016/0198395 A1* | 7/2016 | Hou | H04L 5/00 |
| | | | 455/434 |
| 2016/0233994 A1* | 8/2016 | Prasad | H04W 72/06 |
| 2017/0339012 A1* | 11/2017 | He | H04W 24/00 |
| 2019/0090247 A1 | 3/2019 | Qvarfordt et al. | |

FOREIGN PATENT DOCUMENTS

| | | | | |
|---|---|---|---|---|
| EP | 2154795 | A1 | 2/2010 | |
| EP | 2330856 | A1 | 6/2011 | |
| EP | 2464159 | A1 | 6/2012 | |
| EP | 2579658 | A1 | 4/2013 | |
| EP | 2679040 | B1 | 4/2018 | |
| WO | 9706648 | A1 | 2/1997 | |
| WO | 2013009233 | A2 | 1/2013 | |
| WO | 2016134755 | A1 | 9/2016 | |
| WO | WO-2017101334 | A1 * | 6/2017 | ............. G06F 3/162 |
| WO | WO-2019086098 | A1 * | 5/2019 | |
| WO | WO-2019101334 | A1 * | 5/2019 | ........ H04W 36/0083 |
| WO | 2019110089 | A1 | 6/2019 | |

OTHER PUBLICATIONS

Hadi Ghauch et al,"Coordination and Antenna Domain Formation in Cloud-RAN systems", IEEE ICC 2016—Signal Processing for Communications Symposium, total 7 pages.

Mathias Bohge et al,"Optimal soft frequency reuse and dynamic sub-carrier assignments in cellular OFDMA networks", Copyright 2010 John Wiley and Sons, Ltd., Apr. 20, 2010, total 11 pages.

Donald Parruca et al,"Semi-Static Interference Coordination in OFDMA/LTE Networks: Evaluation of Practical Aspects", In Proc, of the ACM/IEEE International Symposium on Modeling, Analysis and Simulation of Wireless and Mobile Systems 2014 (MSWIM 2014), Montreal, Canada, Sep. 2014, total 9 pages.

* cited by examiner

COORDINATOR NETWORK NODE AND ACCESS NETWORK NODES FOR RESOURCE ALLOCATION IN A WIRELESS COMMUNICATION SYSTEM

CROSS-REFERENCE TO RELATED APPLICATIONS

This application is a continuation of International Application No. PCT/EP2018/061111, filed on May 2, 2018, which is hereby incorporated by reference in its entirety.

TECHNICAL FIELD

Embodiments of the disclosure relate to a coordinator network node and a network access node. Furthermore, the disclosure also relates to corresponding methods and a computer program.

BACKGROUND

In the context of cloud radio access network (CRAN), the issue of interference coordination between different CRANs is quite new. The CRAN architecture itself is a result of the effort to better tackle interference between multiple transmission points in a cellular system, such as LTE and NR. While suitable resource allocation algorithms for a CRAN address the issue of interference within it, they do not address in general the interference between neighboring CRANs. These former methods relate to the formation of a CRAN, for which the interference relationships between users and remote radio heads are important.

Within the standardization of LTE, some exchange of statistical information between neighboring cells are defined. The X2 application protocol (X2AP) is the involved interface for communication between cells and defines in particular the exchange of Load Indication messages and Resource Status Reporting messages. Load Indication messages relate to the perceived (average or peak) interference levels experienced by some cell and are exchanged in order to allow neighboring cells to take these measurements into account when performing resource allocation. Further information in such messages relates to resource allocation settings of the sending cell, such as transmit power or blanked frames. While the messages are typically triggered by measurements within a respective cell, requests to report such measurements can also be placed by an initiating cell. This concept is generalized in the Resource Status Reporting message exchanges, allowing the requesting cell to specify more precisely which information is of interest. Potential items to be reported by the receiving cell include radio resource status, transport network layer (TNL) and hardware load indications as well as capacity reporting.

SUMMARY

Embodiments of the disclosure are to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a coordinator network node for a wireless communication system, the coordinator network node being configured to

- receive a first measurement message from a first network access node, wherein the first measurement message comprises a first set of radio measurements and an associated first set of positions for client devices served by the first network access node in a first service area;
- receive a second measurement message from at least one second network access node, wherein the second measurement message comprises a second set of radio measurements and an associated second set of positions for client devices served by the second network access node in a second service area;
- determine a joint resource allocation area based on the first measurement message and the second measurement message, wherein the joint resource allocation area comprises positions for client devices for which resource allocation in the first service area creates interference in the second service area, or vice versa;
- determine a first subarea of the first service area and a second subarea of the second service area, respectively, based on the first measurement message and the second measurement message, wherein the first subarea and the second subarea comprise positions for client devices affecting resource allocation in the joint resource allocation area;
- transmit a first area specification message comprising the first subarea to the first network access node;
- transmit a second area specification message comprising the second subarea to the second network access node.

The joint resource allocation area can be derived based on the radio measurements and the associated positions of the first measurement message and the second measurement message. The joint resource allocation area is e.g. derived based on the positions where a certain measurement comparison criteria is fulfilled. In one example, the joint resource allocation area can be derived based on a comparison of path loss estimations between the client devices served by a first network access node and radio heads of a second network access node. In another example, the received power from radio heads of a second network access node can be used as the measurement. In a third example the joint resource allocation area can be derived based on a comparison of channel estimations, or channel state information. The joint resource allocation area is in conventional solutions also commonly referred to as the cell edge area.

The joint resource allocation area can further be represented as a set of positions in a joint resource allocation area, i.e. comprising a set of all the positions where a certain measurement comparison criteria is fulfilled.

The meaning of "affecting resource allocation in the joint resource allocation area" can be understood as positions for client devices which, if a client device would be present in the position, sometimes changes the resource allocation in the joint resource allocation area.

An advantage of the coordinator network node according to the first aspect is that it enables to determine the portion of the first or the second service areas that are free from interference from neighbouring network access nodes where each network access node can perform resource allocations independently. It further enables to determine/identify the joint resource allocation area where neighbouring network access nodes significantly interfere each other. Therefore, e.g. resource allocation in the system can be improved.

In an embodiment, the coordinator network node is further configured to
- determine a resource allocation function (L) for the joint resource allocation area based on the first subarea, the second subarea and the joint resource allocation area;

transmit a resource allocation message to the first network access node and the second network access node, wherein the resource allocation message comprises the resource allocation function and the joint resource allocation area.

An advantage with this embodiment is that it enables to determine an efficient resource allocation for each network access node as governed by the determined resource allocation function that optimizes system performance in the cell edge area.

In an embodiment, the coordinator network node is further configured to determine an updated first subarea and an updated second subarea based on the first measurement message and the second measurement message, respectively;

determine an updated resource allocation function for the joint resource allocation area based on the updated first subarea, the updated second subarea and the joint resource allocation area; and when a performance comparison of the resource allocation function with the updated resource allocation function is less than a performance threshold value, set the resource allocation function to the updated resource allocation function, the first subarea to the updated first subarea, and the second subarea to the updated second subarea.

This embodiment provides an iterative mechanism for finding the resource allocation function, the first subarea, and the second subarea. Different methods can be used for determining the first and the second subareas. In one example, the iteration may start from the joint resource allocation area and by evaluating the performance for small area increments, the first and the second subareas can be determined at the iterative operation where the performance evaluation difference with the preceding iterative operation is smaller than a threshold value. In another example, the iteration may start from the entire first and second service areas, and by evaluating the performance for small area decrements, the first and the second subareas can be determined at the iterative operation where the performance evaluation difference with the initial operation is larger than a threshold value. Further methods are also possible to use for finding the resource allocation function, the first subarea, and the second subarea.

An advantage with this embodiment is that it enables to minimize the information required for applying the resource allocation function and to perform a more efficient resource allocation decision for the joint resource allocation area.

In an embodiment, wherein the first set of radio measurements in the first measurement message is a first set of channel state information;

the second set of radio measurements in the second measurement message is a second set of channel state information.

An advantage with this embodiment is that it enables to increase the accuracy of the optimized resource allocation and improve the system performance in the joint resource allocation area.

In an embodiment, the first measurement message further comprises a first set of time stamps associated with at least one of the first set of radio measurements and the associated first set of positions;

the second measurement message further comprises a second set of time stamps associated with at least one of the second set of radio measurements and the associated second set of positions;

the joint resource allocation area, the first subarea, and the second subarea are determined further based on the first set of time stamps and the second set of time stamps.

An advantage with this embodiment is that it enables to coordinate the first and the second set of radio measurements and consequently coordinate the resource allocation of the first and the second network access node in the joint resource allocation area.

In an embodiment, the coordinator network node is further configured to transmit a first additional measurement message to the first network access node, wherein the first additional measurement message comprises positions for client devices in the associated second set of positions coinciding with the second subarea;

transmit a second additional measurement message to the second network access node, wherein the second additional measurement message comprises positions for client devices in the associated first set of positions coinciding with the first subarea.

An advantage with this embodiment is that it enables the first and the second network access node to determine an optimized resource allocation and improve the system performance of the entire first and second service area, respectively.

In an embodiment, the first area specification message further comprises an identity of the second network access node;

the second area specification message further comprises an identity of the first network access node.

An advantage with this embodiment is that it enables the first and the second network access node to determine with which network access node to coordinate with and provide input to for the execution of the resource allocation function.

According to a second aspect of the disclosure, the above mentioned and other objectives are achieved with a network access node for a wireless communication system, the network access node being configured to obtain a first set of radio measurements and an associated first set of positions for client devices served by the first network access node in a first service area;

transmit a first measurement message to a coordinator network node, wherein the first measurement message comprises the obtained first set of radio measurements and the associated first set of positions;

receive a first area specification message from the coordinator network node in response to the transmission of the first measurement message, wherein the first area specification message comprises a first subarea, wherein the first subarea comprises positions in the first set of positions affecting resource allocation in a joint resource allocation area and wherein the joint resource allocation area comprises positions for client devices for which resource allocation in the first service area creates interference in a second service area of a second network node, or vice versa;

determine a resource allocation for the first service area based on the first area specification message.

An advantage of the network access node is that it enables to determine the portion of the first service area that is free from interference from second network access node where the first network access node can perform resource allocations independently. It further enables to determine/identify the joint resource allocation area where the first network access node will significantly interfere the second network access node, or vice versa.

In an embodiment, the network access node is further configured to
- receive a resource allocation message comprising a resource allocation function for the joint resource allocation area and the joint resource allocation area from the coordinator node;
- determine the resource allocation for the first service area further based on the resource allocation message.

An advantage with this embodiment is that it enables the network access node to determine an efficient resource allocation as determined by the received resource allocation function that optimizes system performance in the cell edge area.

In an embodiment, the first set of radio measurements in the first measurement message is a first set of channel state information.

An advantage with this embodiment is that it enables to increase the accuracy of the optimized resource allocation and improve the system performance in the joint resource allocation area.

In an embodiment, the first measurement message further comprises a first set of time stamps associated with at least one of the first set of radio measurements and the associated first set of positions.

An advantage with this embodiment is that it enables the coordinator network node to coordinate the set of radio measurements received by a multiplicity of network access nodes and consequently better coordinate the resource allocation in the cell edge area of the network access nodes. This will increase the performance of the client devices in the service area of the network access node.

In an embodiment, the network access node is further configured to
- receive a first additional measurement message from the coordinator network node, wherein the first additional measurement message comprises positions in a second set of positions for client devices, served by the second network access node in the second service area, affecting resource allocation in the joint resource allocation area;
- determine the resource allocation for the first service area further based on the first additional measurement message.

An advantage with this embodiment is that it enables the network access node to determine an optimized resource allocation and improve the system performance of its entire service area.

In an embodiment, the network access node is further configured to transmit a first position information message to the second network access node, wherein the first position information message comprises positions for active client devices coinciding with the first subarea.

An advantage with this embodiment is that it enables the second network access node to effectively execute the resource allocation function for the cell edge area ensuring coordinated resource allocation execution and stable operation.

In an embodiment, the area specification message further comprises an identity of the second network access node.

An advantage with this embodiment is that it enables the network access node to determine the second network access node with which it should coordinate and provide input to for the execution of the resource allocation function.

In an embodiment, the network access node is further configured to
- receive a second position information message from the second network access node, wherein the second position information message comprises positions for active client devices served by the second network access node in the second service area;
- determine the resource allocation for the first service area further based on the second position information message.

An advantage with this embodiment is that it enables the network access node to effectively execute the resource allocation function for the cell edge area ensuring coordinated resource allocation execution and stable operation.

According to a third aspect of the disclosure, the above mentioned and other objectives are achieved with a method for a coordinator network node, the method comprises
- receiving a first measurement message from a first network access node, wherein the first measurement message comprises a first set of radio measurements and an associated first set of positions for client devices served by the first network access node in a first service area;
- receiving a second measurement message from at least one second network access node, wherein the second measurement message comprises a second set of radio measurements and an associated second set of positions for client devices served by the second network access node in a second service area;
- determining a joint resource allocation area based on the first measurement message and the second measurement message, wherein the joint resource allocation area comprises positions for client devices for which resource allocation in the first service area creates interference in the second service area, or vice versa;
- determining a first subarea of the first service area and a second subarea of the second service area, respectively, based on the first measurement message and the second measurement message, wherein the first subarea and the second subarea comprise positions for client devices affecting resource allocation in the joint resource allocation area;
- transmitting a first area specification message comprising the first subarea to the first network access node;
- transmit a second area specification message comprising the second subarea to the second network access node.

The method according to the third aspect can be extended into implementation forms corresponding to the implementation forms of the coordinator network node according to the first aspect. Hence, an implementation form of the method comprises the feature(s) of the corresponding implementation form of the coordinator network node.

The advantages of the methods according to the third aspect are the same as those for the corresponding implementation forms of the coordinator network node according to the first aspect.

According to a fourth aspect of the disclosure, the above mentioned and other objectives are achieved with a method for a network access node comprising the client device, the method comprises
- obtaining a first set of radio measurements and an associated first set of positions for client devices served by the first network access node in a first service area;
- transmitting a first measurement message to a coordinator network node, wherein the first measurement message comprises the obtained first set of radio measurements and the associated first set of positions;
- receiving a first area specification message from the coordinator network node in response to the transmission of the first measurement message, wherein the first area specification message comprises a first subarea, wherein the first subarea comprises positions in the first set of positions affecting resource allocation in a joint resource allocation area and wherein the joint resource allocation area comprises positions for client devices for which resource allocation in the first service area creates interference in a second service area of a second network node, or vice versa;

determining a resource allocation for the first service area based on the first area specification message.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

Embodiments of the disclosure also relate to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
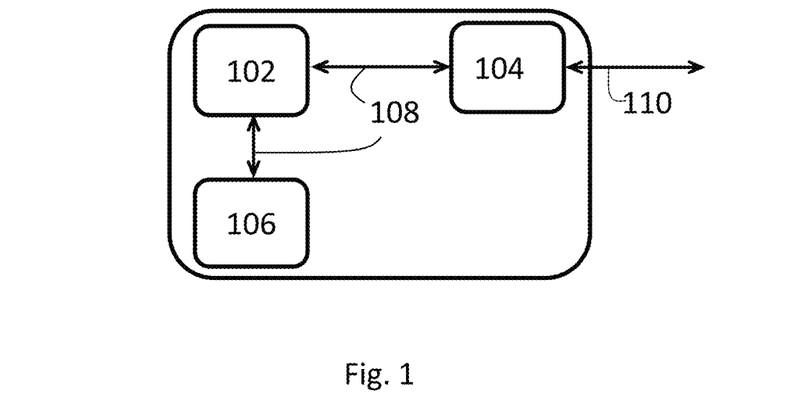
FIG. 1 shows a coordinator network node according to an embodiment of the disclosure.

FIG. 1 shows a coordinator network node 100 according to an embodiment of the disclosure. In the embodiment shown in FIG. 1, the coordinator network node 100 comprises a processor 102, a transceiver 104 and a memory 106. The processor 102 is coupled to the transceiver 104 and the memory 106 by communication means 108 known in the art. The coordinator network node 100 further comprises a wired communication interface 110 coupled to the transceiver 104, which means that the coordinator network node 100 is configured for communications in a wireless communication system. That the coordinator network node 100 is configured to perform certain actions should in this disclosure be understood to mean that the coordinator network node 100 comprises suitable means, such as e.g. the processor 102 and the transceiver 104, configured to perform said actions.

Figure 6:
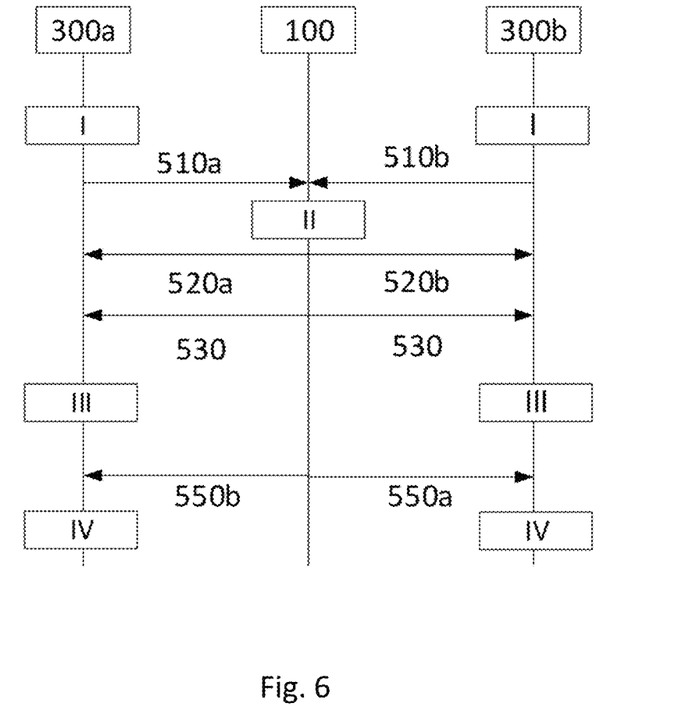
FIG. 6 shows a signalling diagram according to an embodiment of the disclosure.

With reference to FIG. 1 and FIG. 6, the coordinator network node 100 is configured to receive a first measurement message 510a from a first network access node 300a, wherein the first measurement message 510a comprises a first set of radio measurements and an associated first set of positions for client devices served by the first network access node 300a in a first service area; receive a second measurement message 510b from at least one second network access node 300b, wherein the second measurement message 510b comprises a second set of radio measurements and an associated second set of positions for client devices served by the second network access node 300b in a second service area; determine a joint resource allocation area $\Omega_{UE}$ based on the first measurement message 510a and the second measurement message 510b, wherein the joint resource allocation area $\Omega_{UE}$ comprises positions for client devices for which resource allocation in the first service area creates interference in the second service area, or vice versa; determine a first subarea $\Omega_{A+}$ of the first service area and a second subarea $\Omega_{B+}$ of the second service area, respectively, based on the first measurement message 510a and the second measurement message (510b), wherein the first subarea $\Omega_{A+}$ and the second subarea $\Omega_{B+}$ comprise positions for client devices affecting resource allocation in the joint resource allocation area $\Omega_{UE}$; transmit a first area specification message 520a comprising the first subarea $\Omega_{A+}$ to the first network access node 300a; transmit a second area specification message 520b comprising the second subarea $\Omega_{B+}$ to the second network access node 300b. The first area specification message 520a and the second area specification message 520b may be transmitted together in a single transmit operation.

Figure 2:
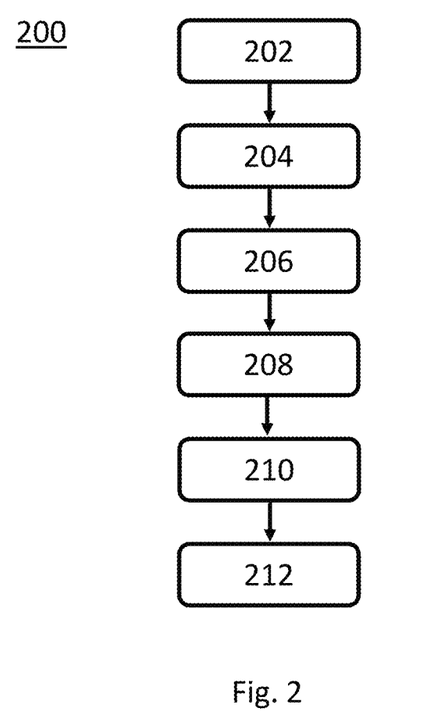
FIG. 2 shows a method according to an embodiment of the disclosure.

FIG. 2 shows a flow chart of a corresponding method 200 which may be executed in a coordinator network node 100, such as the one shown in FIG. 1. With reference to FIG. 1 and FIG. 6, the method 200 comprises receiving 202 a first measurement message 510a from a first network access node 300a, wherein the first measurement message 510a comprises a first set of radio measurements and an associated first set of positions for client devices served by the first network access node 300a in a first service area; receiving 204 a second measurement message 510b from at least one second network access node 300b, wherein the second measurement message 510b comprises a second set of radio measurements and an associated second set of positions for client devices served by the second network access node 300b in a second service area; determining 206 a joint resource allocation area $\Omega_{UE}$ based on the first measurement message 510a and the second measurement message 510b, wherein the joint resource allocation area $\Omega_{UE}$ comprises positions for client devices for which resource allocation in the first service area creates interference in the second service area, or vice versa; determining 208 a first subarea $\Omega_{A+}$ of the first service area and a second subarea $\Omega_{B+}$ of the second service area, respectively, based on the first measurement message 510a and the second measurement message 510b, wherein the first subarea $\Omega_{A+}$ and the second subarea $\Omega_{B+}$ comprise positions for client devices affecting resource allocation in the joint resource allocation area $\Omega_{UE}$; transmitting 210 a first area specification message 520a comprising the first subarea $\Omega_{A+}$ to the first network access node 300a; transmit 212 a second area specification message 520b comprising the second subarea $\Omega_{B+}$ to the second network access node 300b.

Figure 3:
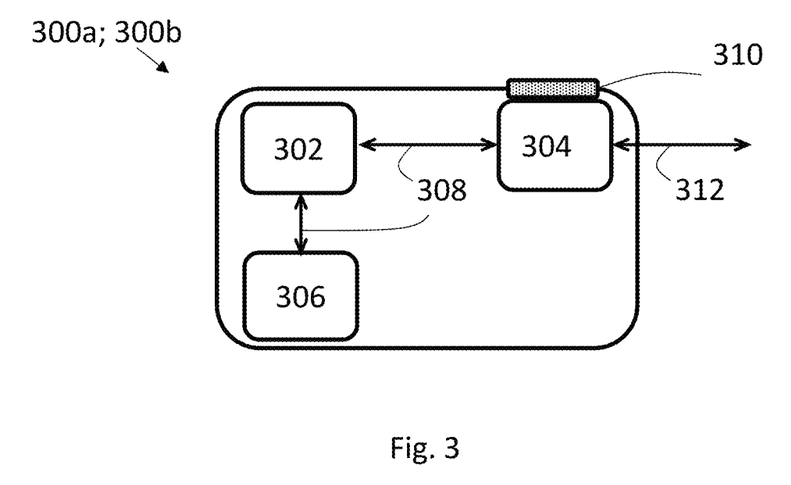
FIG. 3 shows a network access node according to an embodiment of the disclosure.

FIG. 3 shows a network access node 300a; 300b according to an embodiment of the disclosure. In the embodiment shown in FIG. 3, the network access node 300a; 300b comprises a processor 302, a transceiver 304 and a memory 306. The processor 302 is coupled to the transceiver 304 and the memory 306 by communication means 308 known in the art. The network access node 300a; 300b may be configured for both wireless and wired communications in wireless and wired communication systems, respectively. The wireless communication capability is provided with an antenna 310 coupled to the transceiver 304, while the wired communication capability is provided with a wired communication interface 312 coupled to the transceiver 304. The network access node 300a; 300b further comprises an antenna 308 coupled to the transceiver 302, which means that the network access node 300a; 300b is configured for wireless communications in a wireless communication system. That the network access node 300a; 300b is configured to perform certain actions should in this disclosure be understood to mean that the network access node 300a; 300b comprises suitable means, such as e.g. the processor 302 and the transceiver 304, configured to perform said actions.

With reference to FIG. 3 and FIG. 6, the first network access node 300a is configured to obtain a first set of radio measurements and an associated first set of positions for client devices served by the first network access node 300a in a first service area; transmit a first measurement message 510a to a coordinator network node 100, wherein the first measurement message 510a comprises the obtained first set of radio measurements and the associated first set of positions; receive a first area specification message 520a from the coordinator network node 100 in response to the transmission of the first measurement message 510a, wherein the first area specification message 520a comprises a first subarea $\Omega_{A+}$, wherein the first subarea $\Omega_{A+}$ comprises positions in the first set of positions affecting resource allocation in a joint resource allocation area $\Omega_{UE}$ and wherein the joint resource allocation area $\Omega_{UE}$ comprises positions for client devices for which resource allocation in the first service area creates interference in a second service area of a second network node 300b, or vice versa; determine a resource allocation for the first service area based on the first area specification message 520a.

Figure 4:
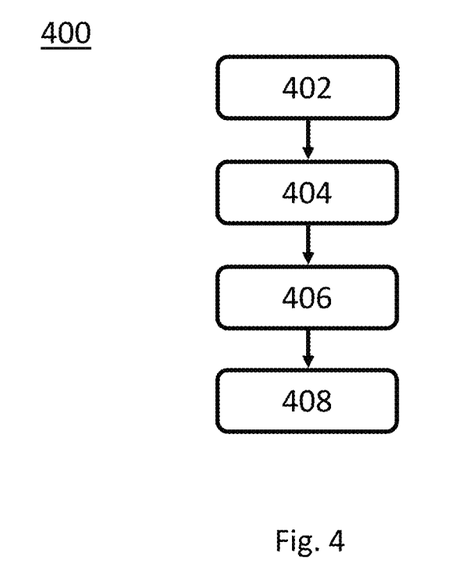
FIG. 4 shows a method according to an embodiment of the disclosure.

FIG. 4 shows a flow chart of a corresponding method 400 which may be executed in a network access node 300, such as the one shown in FIG. 3. With reference to FIG. 4 and FIG. 6, the method 400 comprises obtaining 402 a first set of radio measurements and an associated first set of positions for client devices served by the first network access node 300a in a first service area; transmitting 404 a first measurement message 510a to a coordinator network node 100, wherein the first measurement message 510a comprises the obtained first set of radio measurements and the associated first set of positions; receiving 406 a first area specification message 520a from the coordinator network node 100 in response to the transmission of the first measurement message 510a, wherein the first area specification message 520a comprises a first subarea $\Omega_{A+}$, wherein the first subarea $\Omega_{A+}$ comprises positions in the first set of positions affecting resource allocation in a joint resource allocation area $\Omega_{UE}$ and wherein the joint resource allocation area $\Omega_{UE}$ comprises positions for client devices for which resource allocation in the first service area creates interference in a second service area of a second network node 300b, or vice versa; determining 408 a resource allocation for the first service area based on the first area specification message 520a.

For providing an even deeper understanding of the disclosure the following description is set in a CRAN cellular deployment with thereto terminology. Therefore, a first network access node 300a is denoted a CRAN A, a second network access node 300b is denoted a CRAN B, a client device is denoted UE, etc. Embodiments of the disclosure are however not limited thereto and can be applied in any suitable system.

For future CRAN systems in general operated by any resource allocation algorithm, the methods of conventional solutions allow only a very limited amount of information exchange, for example power settings per cell, current choices of utilized resource blocks or statistical information exchange. In particular, conventional solutions do not allow or define the exchange of fine-grained resource allocation decisions or an aggregate of such information by some cell to be made available to the other cell. In particular, this is true with respect to a previously defined spatial area—i.e. the mutual interference area—where through the exchange of a learned data structure a harmonized resource allocation of all involved CRANs can be achieved.

In this disclosure, CRAN can comprises of a non-empty set of radio access units and a central processing unit. The radio access units, which constitute transmission points formed from distributed antenna systems also referred to as remote radio heads (RRHs), are separated from the central processing unit, that handle all the baseband processing. A component of the disclosure is based on the operation of each individual CRAN to generate resource allocations. This is supposed to be done by means of supervised machine learning algorithms, such as deep learning or the Classification and Regression Trees (CART)-like procedure originally proposed for Random Forests. Supervised machine learning requires larger sets of labeled data that are representative for the operation of the system. From this, data structures, for example decision trees or neural networks, are extracted which capture the essential relations in the system. It has been shown that such learning approaches can provide equal performance when benchmarked with upper bounds on CRAN performance.

However, such approaches so far relied only on training data input from within the considered CRAN and thus ignored the impact of inter-CRAN interference. This disclosure relates thus to a solution how neighboring CRANs can coordinate their operations to mitigate inter-CRAN interference, assuming that both of them perform resource allocations through learning-based schemes which takes the position information of associated UEs as input.

Figure 5:
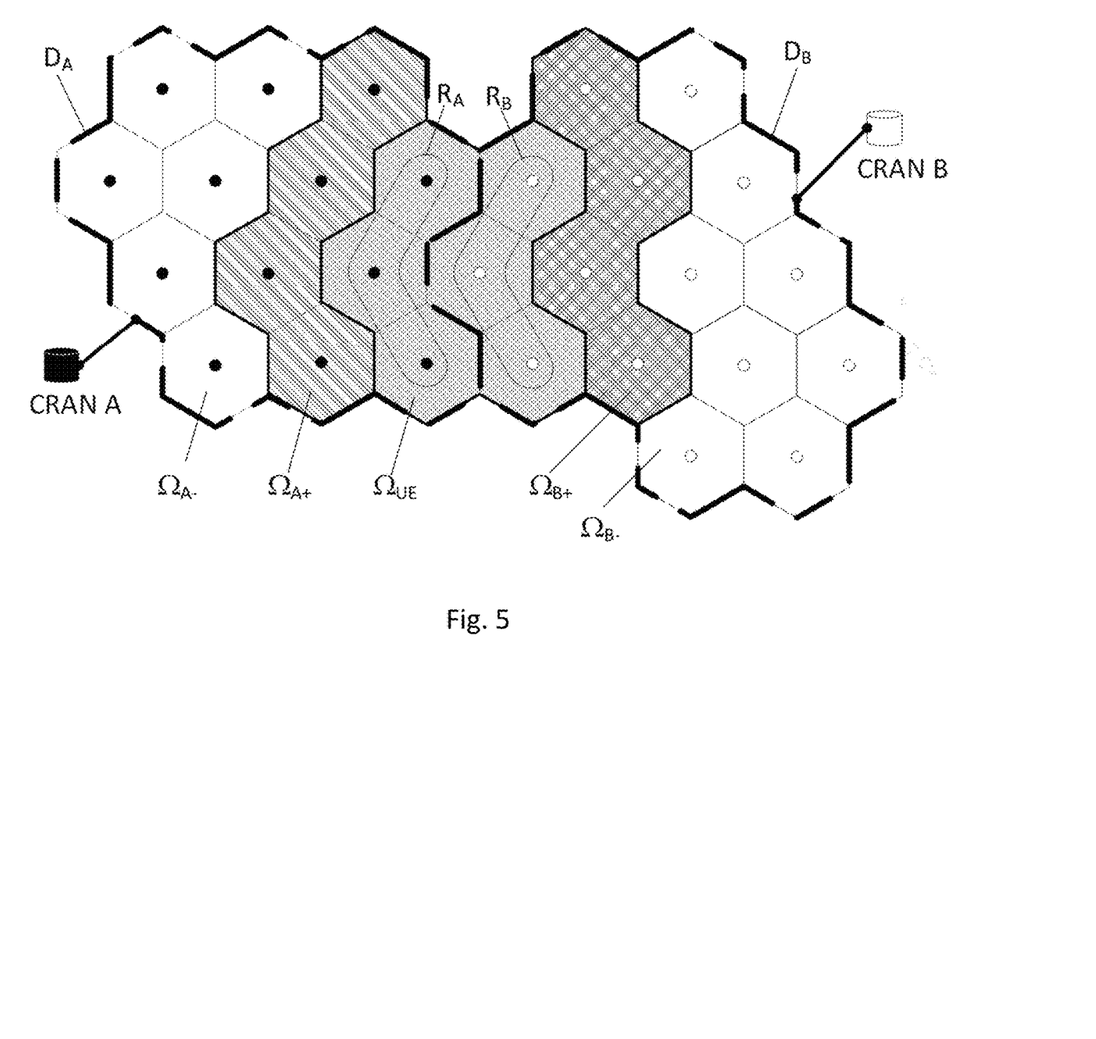
FIG. 5 illustrates interfering network access nodes in a CRAN system.

Two CRAN systems A and B, which have interfering sets of radio heads $R_A$ and $R_B$, as shown in FIG. 5 are considered. The CRAN A comprises of radio heads on the left hand side of the wireless network, represented as black circles in the middle of the hexagons. The hexagons are representing the coverage area of each radio head. The CRAN B comprises of radio heads on the right hand side of the wireless network, represented as white circles in the middle of the hexagons. The joint resource allocation area $\Omega_{UE}$ is represented as the dotted area in between the two CRANs. The first subarea $\Omega_{A+}$ is represented as the striped area and the second subarea $\Omega_{B+}$ is represented as the squared area. The technical solution suggested herein is applicable in both a single-operator and a multiple-operator scenario where the two CRANs belong to one and two different operators, respectively. The downlink operation of both CRANs are in focus. The scenario is furthermore related to the joint resource allocation area $\Omega_{UE}$ of UE positions which are potentially interfered by radio heads within the sets $R_A$ and $R_B$. All UE positions in the joint resource allocation area $\Omega_{UE}$ are either associated to CRAN A or B, while their beacon signals from a UE can be received by radio heads in both sets $R_A$ and $R_B$. The beacon signals can be uplink reference signals, such as sounding reference signal in LTE or NR, or other uplink signals used for estimating the position of the UE. Hence, UEs located at positions in the joint resource allocation area $\Omega_{UE}$ can be tracked in both CRANs either in terms of their channel states or in terms of their positions, which subsequently also means that all UEs located at positions in the joint resource allocation area $\Omega_{UE}$ might be interfered by at least one radio head of the neighboring CRAN.

A general idea is to run each interfering CRAN through two sequentially learned data structures. One learned data structure governs the interfering area, i.e. relating to the radio heads of sets $R_A$ and $R_B$ as well as any UEs located at positions within the joint resource allocation area $\Omega_{UE}$. This data structure can be learned through a coordinator network node 100 in an initial operation, after training data from both CRANs has been provided. Once this jointly learned data structure is determined, it is passed to both CRAN A and B. Then, CRAN A and B generate a subsequently learned data structure for the remainder of their respective service area. Given this sequenced learning phase is performed and all learned data structures are in place, during system operations the CRANs exchange state information to allow each other to uniquely identify the given load and UE distribution situation in the interfering area. Once this resource allocation has been determined (e.g. at run-time) by each involved CRAN, the CRANs subsequently determine the resource allocation for the remaining service areas of CRAN A and B. In this way, interference within the joint resource allocation area $\Omega_{UE}$, is harmonized between the CRANs, while still leaving room for individual optimizations performed for the remaining area of the CRANs. In the case of a multiple-operator scenario, the coordinator network node 100 may be operated jointly by the operators or by a trusted 3rd party, such as a public regulating authority.

An objective is the coordination of interference in the cell edge between two neighboring radio networks, i.e. between CRAN A and CRAN B in this particular example. For this a central coordinator network node 100 is used to perform allocation of resources, for example, based on machine learning algorithm. The coordinator network node 100 identifies the positions of the UEs of subarea of the neighboring CRAN where resource allocation has an impact to the cell-edge interference. Furthermore, the coordinator network node 100 determines the allocation resource decisions based on the UE positions in both cell-edge and in the identified subarea of the neighboring cell that lies in the proximity of the cell edge. The coordinator network node 100 communicates the allocation decisions and instructs the two neighboring CRANs to communicate with each other additional UE position information and measurements within the respective subareas that lies in the proximity of the cell edge. In a further operation, the CRANs may determine an resource allocation for their remaining area outside the cell-edge that does not violate the cell-edge interference coordination.

To accomplish the above-mentioned interference-coordinated operation of the two CRANs, the following operations are described which comprise of the following components.

Training data collection and provisioning: it is initially assumed that the CRANs to operate independently and allocate resources through some conventional scheme, potentially even employing some form of conventional interference coordination. However, during this phase, the CRANs also collect instances for training. At the end of this phase these training instances are provided to some coordinator network node 100 that has previously been agreed upon. The way this coordinator network node 100 is agreed upon is outside the scope of this disclosure.

Joint learning for the joint resource allocation area set $\Omega_{UE}$: Given the provisioning of the training instances from the two interfering CRANs, the coordinator network node 100 determines a learned data structure regarding resource allocation for UEs located at positions of the joint resource allocation area set $\Omega_{UE}$. Hence, a prerequisite is to determine this joint resource allocation area $\Omega_{UE}$ of interfered positions, which is expected to be comprised by the positions at which both CRANs receive UL reference signals from the UEs. The learned data structure is based on resource allocations that have been determined by the coordinator network node 100 prior to learning. Furthermore, the coordinator network node 100 determines through a sequence of learning stages the additional amount of state information from CRANs A and B that is required to determine distinct resource allocations through the learned data structure regarding the joint resource allocation area $\Omega_{UE}$. The stage is finalized by the coordinator network node 100 indicating to the involved CRANs the resulting learned data structure as well as the requirements regarding the additional information from the neighboring CRANs in order to operate the data structure governing the resource allocation of the radio heads of sets $R_A$ and $R_B$ as well as for the UEs positioned at some of the locations of the joint resource allocation area $\Omega_{UE}$.

Learning of the individual CRANs based on the jointly learned data structure: In this phase the CRANs each determine first resource allocations based on their previously collected training data as well as based on the provided learned data structure for the interfered region of UEs. For this, the CRANs also require input regarding the potential, additional information from the respective neighboring CRANs state that is relevant to operate the jointly learned data structure. Once these resource allocations are determined, the next operation is to determine for the remaining set of UEs within the CRAN a learned data structure. This is done for each CRAN individually by the respective CRAN itself.

System operation: In this phase, the harmonized system is in operation. Once both CRANs have completed their individual learning, they switch to a joint operation where they periodically exchange the additionally required state information, and then determine resource allocations through the jointly learned data structure as well as their individually learned data structure. This phase ends with one of the CRANs announcing the switch back to the operation of its resource allocation through a default algorithm, i.e. an algorithm which is not based on a learned data structure, and hence also the jointly learned data structure, which harmonizes interference, is not taken into consideration any longer.

With reference to operation I in FIG. 6, each CRAN, in this example CRAN A and CRAN B, operates on some preconfigured resource allocation scheme which, e.g. can be CSI-based. During this operation, nevertheless, the CRANs collect training data/instances, comprising of the positions of the UEs and their CSI with respect to all radio heads of the respective CRAN. At some point, this information is provided to the coordinator network node 100. The following messages/data exchanges between CRAN A and CRAN B with the coordinator network node 100 are used:

A first measurement message 510a from CRAN A to the coordinator network node 100: In this message CRAN A provides all training data of its entire service area $D_A$ to the coordinator network node 100; and A second measurement message 510b from at least one second CRAN B to the coordinator network node 100: In this message CRAN B provides all training data of its entire service area $D_B$ to the coordinator network node 100.

For instance, in an embodiment, the collected training data per CRAN A and CRAN B would comprise of sets of channel state information instances ordered by precise time stamps. Per instance, the training data would contain the following information per associated UE: UE position, channel state information regarding each radio head of the respective CRAN, data buffer backlog. The training data could furthermore comprise of the following additional information per time-stamped instance: UE IDs seen through beaconing by radio heads of the CRAN (providing also which radio heads specifically saw the beacon), channel state information regarding each radio head and seen UE ID. These training data instances are provided to the coordinator network node 100. Hence, according to embodiments the first measurement message 510a further comprises at least a first set of time stamps associated with at least one of the first set of radio measurements and the associated first set of positions. Further, the second measurement message 510b further comprises at least second set of time stamps associated with at least one of the second set of radio measurements and the associated second set of positions. Therefore, the coordinator network node 100 can determine the joint resource allocation area $\Omega_{UE}$, the first subarea $\Omega_{A+}$, and the second subarea $\Omega_{B+}$ further based on the first set of time stamps and the second set of time stamps.

With reference to operation II in FIG. 6, the coordinator network node 100 takes the received training data from CRAN A and CRAN B, and determines a resource allocation function L for the radio heads in sets $R_A$, $R_B$ as well as for UEs located at the joint resource allocation area $\Omega_{UE}$. A prerequisite for learning the joint data structure is to determine resource allocations regarding radio heads of the sets $R_A$, $R_B$ as well as UEs located in the joint resource allocation area $\Omega_{UE}$. Before this operation is undertaken, these sets first need to be determined. For the joint learning, a larger set of UE positions might need to be taken into account as input parameters. A motivation for the usage of a coordinator network node 100 is the identification of a range within the service area of both CRANs beyond which the consideration of radio head and UE interactions does not play any role for the learned resource allocations regarding the intersection sets $R_A$, $R_B$ and the joint resource allocation area $\Omega_{UE}$. Once this is determined, the coordinator network node 100 discloses the resource allocation function L to both CRANs, along with the specification of the input feature vector for the learned data structure (i.e., the range of additional elements of the CRANs to be taken into consideration when reading from the jointly learned data structure). Two types of messages are used for this:

Resource allocation message 530 from the coordinator network node 100 to CRAN A and CRAN B: In this message the coordinator network node 100 provides the learned data structure for the resource allocation function L and the joint resource allocation area $\Omega_{UE}$. For instance, if a random forest is used as learned data structure, this message can include the following elements:

Definition of input feature vector of N features: ($X_1$: MeaningX$_1$), ($X_2$: MeaningX$_2$) . . . ($X_N$: MeaningX$_N$), e.g., $X_1$, $X_2$, and $X_N$ characterizes position instances $x_1$, $x_2$, and $x_N$ from the following domains $x_1 \in \Omega_{UE}$, $X_2 \in \Omega_{A+}$, and $x_N \in \Omega_{B+}$ with a meaning according to the definitions of the corresponding sets $\Omega_{UE}$, $\Omega_{A+}$, and $\Omega_{B+}$ respectively. Apart from sets positions, $X_N$:s may also characterize transceiver instances and their states such as radio heads, e.g., $R_A$ and $R_B$, UEs, base stations and other transmitting or receiving radio devices along with their transmit/receive power, CSI, active state, buffer state or other state info as necessary etc.

Definition of output class of M elements: ($Y_1$: MeaningY$_1$), ($Y_2$: MeaningY$_2$) . . . ($Y_M$: MeaningY$_M$), e.g., each of $Y_1$, $Y_2$, and $Y_M$ characterizes a resource allocation parameter and its corresponding meaning, such as, radio head, receiver filter, transmitter beam, modulation and coding scheme, frequency/time resources, transmit/receive power and other resource allocation related variables.

Definition of Q learned trees: $T_1, T_2, \ldots, T_Q$, e.g., each of $T_1$, $T_2$, and $T_Q$ determines a mapping between the instances of the input feature vector and the output elements.

First area specification message 520a and second area specification message 520b from the coordinator network node 100 to each CRAN: In these messages a first subarea $\Omega_{A+}$ and a second subarea $\Omega_{B+}$, respectively, is transmitted to the CRANs. Additional requirements in terms of state characterization of each CRAN to the other CRAN is hereby announced. In addition to the input feature vector as defined above, this message includes a specification of a further set of UE positions which need to be disclosed to the neighboring CRAN to allow the correct determination of resource allocations from the jointly learned data structure. The following message structure can be used for the area specification messages:

Definition of set of Z positions where UEs need to be reported if located at one such position: $P_1, P_2, \ldots, P_Z$, e.g., $P_1$, $P_2$, and $P_Z$ defining the positions domains of $\Omega_{UE}$, and $\Omega_{A+}$, or $\Omega_{UE}$ and $\Omega_{B+}$ depending on whether the neighboring CRAN is CRAN A or CRAN B.

In an embodiment, after receiving the training data the coordinator network node 100 first determines the sets $R_A$, $R_B$ and joint resource allocation area $\Omega_{UE}$. Initially the joint resource allocation area $\Omega_{UE}$ is determined. For this, from the training data set of CRAN A first all positions are determined for which non-associated UEs have been identified through beaconing. Next, the same is applied to the training data of CRAN B. Given the positions of the joint resource allocation area $\Omega_{UE}$, next the set of interfering radio heads $R_A$, subarea $\Omega_B$ are determined. For this, any interference relationship to any radio head from any of the positions in the joint resource allocation area $\Omega_{UE}$ is identified and the corresponding radio head are stored either in set $R_A$ or $R_B$.

Given the definition of the sets $R_A$, $R_B$ and joint resource allocation area $\Omega_{UE}$, in the embodiment the next operation is to determine a resource allocation function L for the service of UEs located in the joint resource allocation area $\Omega_{UE}$, while being served by a radio head either in $R_A$ or $R_B$.

For this, the first operation is to determine the resource allocation for each training instance. This is performed off-line according to some objective function. Once the resource allocations have been determined for the combined training data of CRANs A and B, the next operation is to build a learned data structure for the resource allocations involving radio heads of either sets $R_A$ or $R_B$ as well as UEs located in the joint resource allocation area $\Omega_{UE}$. The input feature vector for such a jointly learned data structure contains for example the positions of all radio heads of sets $R_A$ or $R_B$ as well as the positions of all UEs located at any coordinate in the joint resource allocation area $\Omega_{UE}$. The output (class) of a jointly learned data structure is then the radio resource allocation per UE, i.e. an association to a radio head, an assigned beam and filter combination, as well as an assigned modulation and coding scheme.

Once an initial learned data structure has been determined, a further operation of an embodiment comprises to determine the sensitivity of the resource allocation regarding sets $R_A$, $R_B$ and joint resource allocation area $\Omega_{UE}$ with respect to the behavior of further radio heads deeper into the areas of CRAN A and B. Essentially, the coordinator network node 100 runs a sequence of trained data structure generations or iterations for which in each operation a wider inclusion UEs in subareas $\Omega_{A+}$ and $\Omega_{B+}$ of the respective CRANs are taken into account, first of all with respect to resource allocation generation, and then with respect to learning. The coordinator network node 100 checks subsequently the resulting resource allocations obtained from several trained data structures with respect to the output regarding the interfering sets $R_A$, $R_B$ and joint resource allocation area $\Omega_{UE}$ (while the input feature becomes subsequently larger, spanning a larger and larger area in addition to the sets $R_A$, $R_B$ and $\Omega_{UE}$). Once the resource allocations regarding the sets $R_A$, $R_B$ and joint resource allocation area $\Omega_{UE}$ do not change anymore for a given input regarding UEs at positions in the joint resource allocation area $\Omega_{UE}$ as well as in the sub areas $\Omega_{A+}$ and $\Omega_{B+}$, the preferable input feature vector regarding UEs with respect to the joint resource allocation area $\Omega_{UE}$ (as well as subareas $\Omega_{A+}$ and $\Omega_{B+}$) has been determined. The matching resource allocation function L is then the data structure to be provided to the two CRANs A and B. FIG. 5 illustrates the relationship of sets $R_A$, $R_B$, $\Omega_{UE}$, $\Omega_{A+}$ and $\Omega_{B+}$. Hence, in other words the iterative method comprises for each operation determine an updated first subarea $\Omega_{An+}$ and an updated second subarea $\Omega_{Bn+}$ based on the information provided in the first measurement message 510a and the second measurement message 510b, respectively. Thereafter, an updated resource allocation function L' for the joint resource allocation area $\Omega_{UE}$ is determined based on the updated first subarea $\Omega_{An+}$, the updated second subarea $\Omega_{Bn+}$ and the joint resource allocation area $\Omega_{UE}$. Finally, when a performance comparison of the resource allocation function L with the updated resource allocation function L' is less than a performance threshold value the iterations stops the resource allocation function L is set to the updated resource allocation function L', the first subarea $\Omega_{A+}$ to the updated first subarea $\Omega_{An+}$, and the second subarea $\Omega_{B+}$ to the updated second subarea $\Omega_{Bn+}$.

Figure 7:
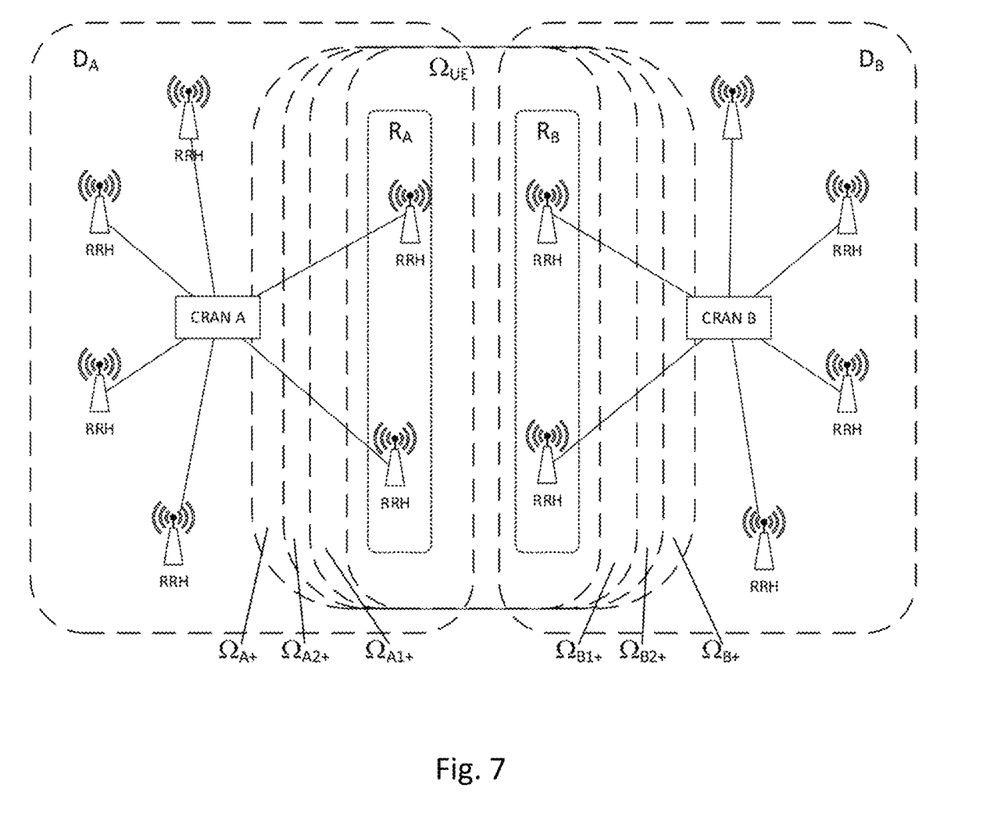
FIG. 7 illustrates how an additional area can be found according to an embodiment of the disclosure.

In one embodiment, the data structures are a set of optimized resource allocation (RA) functions that map a set of input features to a set of resource allocation decisions. This set of optimized RA functions or rules have been derived based on a supervised learning technique, called Random Forest, which aims at generalizing a set of training data examples to a set of rules of a tree-structure format. Other statistical classification methods, functions and rule representations are also possible. Herein the set of input features is related to the position of UEs. The objective is to identify the position area outside joint resource allocation area $\Omega_{UE}$ for which resource allocation decisions may have an impact on the interference within $\Omega_{UE}$. This can be done for each CRAN iteratively, say, CRAN A. Initially a smaller slice of the position area $\omega_{A1+} \subset \Omega_{A+}$ is optimized with regards to the interference in joint resource allocation area $\Omega_{UE}$. At each operation of the iteration, say $n^{th}$ operation, the slice of the position area to be optimized may increase with a certain portion, i.e., $\Omega_{A1+} \subset \ldots \subset \Omega_{An+} \subset \ldots \subseteq \Omega_{A+}$ as illustrated in FIG. 7. The figure shows the two CRANs A and B and their respective radio heads (denoted RRH in the Figs.). The joint resource allocation area $\Omega_{UE}$ is the center area shown with a solid line in between the service areas of CRAN A, i.e. $D_A$ (service area of CRAN A), and CRAN B, i.e. $D_B$ (service area of CRAN B). The dashed lines enclose the different slices of the service area marked with $\Omega_{A1+}$, $\Omega_{A2+}$ and $\Omega_{A+}$ on the left side and $\Omega_{B1+}$, $\Omega_{B2+}$ and $\Omega_{B+}$ on the right side. The increase of the slices and the number of iterations may continue until further tangible improvements on the interference optimization are no longer feasible. At that point the resulted slice size of the position area coincides with the sub area $\Omega_{A+}$.

In one embodiment, starting with a portion of the joint resource allocation area $\Omega_{UE}$ that a CRAN covers, at each iterative operation an increase can be based on a geographical region of a predetermined area size and represented by geographical position coordinates. The first subarea $\Omega_{A1+}$ would correspond to the portion of the joint resource allocation area $\Omega_{UE}$ covered by CRAN A and the area of the predetermined area size, while the second subarea $\Omega_{A2+}$ would correspond to the first subarea $\Omega_{A1+}$ and an additional area of the predetermined size.

In embodiments, the subareas of CRAN A can be defined by positions based on radio measurements, such as path loss estimations to radio heads in $R_A$ that are below a certain threshold, or received power above a certain threshold. The subarea increments can also be based on minimum geometrical distances from the radio heads in $R_A$. The same methods can be used to determine the subareas and the subarea increments of CRAN B.

In yet another embodiment, subarea increments can be defined by the areas covered by a radio head. According to this embodiment, a first subarea $\Omega_{A1+}$ would then be defined by the portion of the joint resource allocation area $\Omega_{UE}$ covered by CRAN A and the area covered by radio head with index {1}, while the second subarea would be defined by the covered portion of the joint resource allocation area $\Omega_{UE}$ and the area covered by both the radio head with index {1} and radio head with index {2}, and so on.

In further embodiments the iteration can be performed by starting from the entire service area $D_A$ for CRAN A and/or $D_B$ for CRAN B, and progress in terms of decrements of geographical regions or radio headsets as suggested above towards joint resource allocation area $\Omega_{UE}$.

It has to be noted that optimized with regards to the interference in joint resource allocation area $\Omega_{UE}$ at each iteration refers to the optimized resource allocation rules that map the position area slices to resource allocation decisions for $R_A$.

In addition, the two CRANs are provided the information regarding the required input feature vector, basically the fact that UEs from the joint resource allocation area $\Omega_{UE}$, subarea $\Omega_{A+}$ and subarea $\Omega_{B+}$ have to be considered. Finally, the CRANs are also provided additional training data of the respective other CRAN regarding the subarea $\Omega_{A+}$ and $\Omega_{B+}$. This completes operation II.

With reference to operation III in FIG. 6, each CRAN takes its training data and determines learned data structures for the remaining service area which is not covered by the provided, jointly learned data structure for resource allocation in the joint resource allocation area. In order to determine these individual, complimentary data structures, additional training data according to the area specification messages from the previous operations needs to be disclosed. Once this is disclosed, each CRAN can determine its own learned data structure. Hence, only one message type is required for this:

First additional measurement message 540a and second additional measurement message 540b are transmitted from the coordinator network node 100 to each CRAN: Each CRAN requires additional data from each other to operate the jointly learned data structure provided by the coordinator network node 100. In this message, additional training data is provided from the training data of the other CRAN. This may include the additional positions of UEs in subarea $\Omega_{A+}$ for CRAN B, and the positions of UEs in subarea $\Omega_{B+}$ for CRAN A. These reported instances have to match the training instances by means of timestamps provided from the respective CRANs during operation I. The following structure can be used for this:

Provisioning of Z additional training data instances: $I_1$, $I_2$, ..., $I_Z$ comprising information as defined in operation I above.

In an embodiment, during the individual training phase of a CRAN A, it would in an initial operation determine, based on the additional positions in the subarea $\Omega_{B+}$ of the neighbor CRAN and positions in the subarea $\Omega_{A+}$, the operation of the radio heads in $R_A$ for the joint resource allocation area $\Omega_{UE}$. In a subsequent operation from the provided training data and the joint learned data structure the individual training phase of CRAN A, it would further determine the operation of the radio heads in the remaining of service area of $D_A$ comprising the subareas of $\Omega_{A+}$ and $\Omega_{A-}$ as shown in FIG. 5. The resulting resource allocations are then used to update the training data set regarding the remaining of service area of $D_A$. Next, CRAN A determines for the updated training data set the resource allocations, from which it next generates the learned data structure regarding the resource allocations within CRAN A. It has to be noted that the learned data structure regarding the resource allocations within CRAN A can be generated based on a fully different objective function. The above procedure training phase description is similarly performed by CRAN B.

With reference to operation IV in FIG. 6, once the three previous operations I-III have been completed, the coordinator network node 100 activates each CRAN to switch to the operational mode based on the learned data structures. During this operation, each CRAN discloses to its neighboring CRAN those additional state information, i.e., CRAN A provides UEs located at positions in subarea $\Omega_{A+}$ to CRAN B, or vice versa. Therefore, a first position information message 550a is transmitted from CRAN A directly to CRAN B, e.g. via a backbone interface. The first position information message 550a comprises positions for active UEs coinciding with the first subarea $\Omega_{A+}$. Further, CRAN A receives a second position information message 550b directly from CRAN B. The second position information message 550b comprises positions for active UEs served by the CRAN B in the second service area.

Finally, CRANs can also cancel their operation on the learned data structures. Hence, the following non-illustrated messages can be used:

Learning-based operation activation message from coordinator network node 100 to each CRAN: With this message, the coordinator network node 100 switches both CRANs to the operation based on the jointly learned data structure L.

CRAN state characterization message from each CRAN to each CRAN: Through this message, each CRAN discloses the additional state required to read from the jointly determined data structure. The additional state has been defined before in the first area specification message. The 'CRAN state characterization' message is exchanged on an event basis or periodically according to a defined interval.

Learning-based operation deactivation message from CRAN to coordinator network node 100, other CRANs: Through this message a CRAN announces the switch back to some other resource allocation scheme.

In an embodiment, the message exchange regarding the CRAN state characterization would relate to each upcoming time frame of the system. In a different embodiment, the state characterization, which is given by the positions of UEs in subarea $\Omega_{A+}$ to CRAN B for CRAN A, would encode multiple different instances over time, for instance by dividing the set of UEs into subsets which are considered during the n next times frames, e.g. in a precisely indicated order.

Figure 8A:
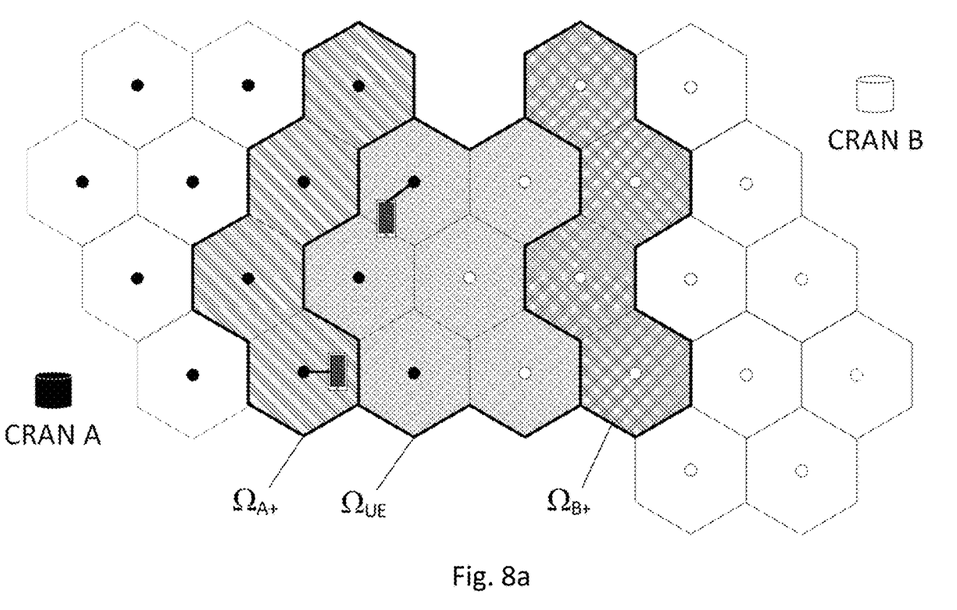
FIGS. 8a and 8b illustrate how client devices in different positions in the additional area can affect the resource allocation in a joint resource allocation area.
Figure 8B:
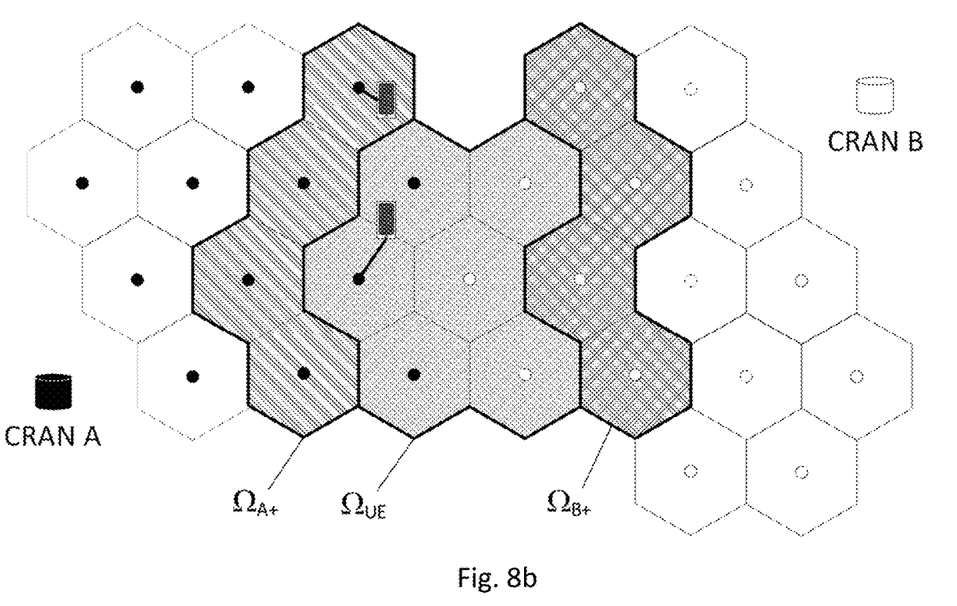

Moreover, FIGS. 8a and 8b show two examples of positions of UEs in the wireless network. The two examples in FIG. 8a and FIG. 8b, respectively, shows an example of how UEs in positions in the first subarea $\Omega_{A+}$ can affect the resource allocation in the joint resource allocation area $\Omega_{UE}$.

The first example is shown in FIG. 8a. The CRAN A comprises of radio heads on the left hand side of the wireless network, represented as black circles in the middle of the hexagons. The hexagons are representing the coverage area of each radio head. The CRAN B comprises of radio heads on the right hand side of the wireless network, represented as white circles in the middle of the hexagons. The radio heads in this example is assumed to have omni-directional antennas transmitting the same power in all directions when used. The joint resource allocation area $\Omega_{UE}$ is represented as the dotted area in between the two CRANs. The first subarea $\Omega_{A+}$ is represented as the striped area and the second subarea $\Omega_{B+}$ is represented as the squared area. There are two UEs in the system, one in the joint resource allocation area $\Omega_{UE}$ and one in the first subarea $\Omega_{A+}$. The UE in the first subarea $\Omega_{A+}$ is allocated resources in the bottom radio head in the first subarea $\Omega_{A+}$ since it is closest, represented with a line. The UE in the joint resource allocation area $\Omega_{UE}$ is assumed to be right in the middle between the two black top radio heads in the joint resource allocation area $\Omega_{UE}$. If it would be allocated resources in the lower of the radio heads, the interference would be higher for the client device in the first subarea $\Omega_{A+}$ compared to if it would be allocated resources in the top radio head, since the distance between the client device in the first subarea $\Omega_{A+}$ is shorter to the bottom radio head. The best resource allocation in terms of interference is then shown as a line between the UE and the radio head.

In FIG. 8b, the UE in the first subarea $\Omega_{A+}$ is now placed near the top radio head of the first subarea $\Omega_{A+}$. Apart from that change, everything is the same as in FIG. 8a. The UE in the first subarea $\Omega_{A+}$ is allocated resources in the top radio head in the first subarea $\Omega_{A+}$ since it is closest, represented with a line. The UE in the joint resource allocation area $\Omega_{UE}$ is still assumed to be in the middle between the two black top radio heads in the joint resource allocation area $\Omega_{UE}$. If it would be allocated resources in the radio head in the top, the interference would be higher for the UE in the first subarea $\Omega_{A+}$ compared to if it would be allocated resources in the lower radio head, since the distance between the UE in the first subarea $\Omega_{A+}$ is shorter to the top radio head. The best resource allocation in terms of interference is then shown as a line between the UE and the radio head.

The coordinator network node 100 herein can e.g. be a server, a server cluster, a mobile edge computing node, or any other suitable network node of the wireless communication system 500.

The network access node 300a, 300b herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

The UE herein, may be denoted as a user device, a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

Furthermore, any method according to embodiments of the disclosure may be implemented in a computer program, having code means, which when run by processing means causes the processing means to execute the operations of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the coordinator network node 100 and the network access node 300a, 300b comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the coordinator network node 100 and the network access node 300a, 300b may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A coordinator network node for a wireless communication system, comprising at least one processor and a memory coupled to the at least one processor and storing programming instructions, which when executed by the at least one processor, cause the at least one processor to perform operations comprising:
   receiving a first measurement message from a first network access node, wherein the first measurement message comprises a first set of radio measurements and a first set of positions for client devices served by the first network access node in a first service area;
   receiving a second measurement message from a second network access node, wherein the second measurement message comprises a second set of radio measurements and a second set of positions for client devices served by the second network access node in a second service area;
   determining a joint resource allocation area ($\Omega$UE) based on the first measurement message and the second measurement message, wherein the joint resource allocation area ($\Omega$UE) comprises positions for client devices for which resource allocation in the first service area creates interference in the second service area, or vice versa;
   determining a first subarea ($\Omega$A+) of the first service area and a second subarea ($\Omega$B+) of the second service area, respectively, based on the first measurement message and the second measurement message, wherein the first subarea ($\Omega$A+) and the second subarea ($\Omega$B+) comprise positions for client devices affecting resource allocation in the joint resource allocation area ($\Omega$UE);
   transmitting a first area specification message having the first subarea ($\Omega$A+) to the first network access node;
   transmitting a second area specification message having the second subarea ($\Omega$B+) to the second network access node.

2. The coordinator network node according to claim 1, wherein the operations further comprise:
   determining a resource allocation function (L) for the joint resource allocation area ($\Omega$UE) based on the first subarea (ΩA+), the second subarea (ΩB+), and the joint resource allocation area (ΩUE);

transmitting a resource allocation message to the first network access node and the second network access node, wherein the resource allocation message comprises the resource allocation function (L) and the joint resource allocation area (ΩUE).

3. The coordinator network node according to claim 2, wherein the operations further comprise:

determining an updated first subarea (ΩAn+) and an updated second subarea (ΩBn+) based on the first measurement message and the second measurement message, respectively;

determining an updated resource allocation function (L') for the joint resource allocation area (ΩUE) based on the updated first subarea (ΩAn+), the updated second subarea (ΩBn+), and the joint resource allocation area (ΩUE); and in response to determining that a performance comparison of the resource allocation function (L) with the updated resource allocation function (L') is less than a performance threshold value, setting the resource allocation function (L) to the updated resource allocation function (L'), the first subarea (ΩA+) to the updated first subarea (ΩAn+), and the second subarea (ΩB+) to the updated second subarea (ΩBn+).

4. The coordinator network node according to claim 1, wherein the first measurement message further comprises a first set of time stamps associated with at least one of the first set of radio measurements or the first set of positions;

the second measurement message further comprises a second set of time stamps associated with at least one of the second set of radio measurements or the second set of positions;

the joint resource allocation area (ΩUE), the first subarea (ΩA+), and the second subarea (ΩB+) are determined further based on the first set of time stamps and the second set of time stamps.

5. The coordinator network node according to claim 1, wherein the operations further comprise:

transmitting a first additional measurement message to the first network access node, wherein the first additional measurement message comprises positions for client devices in the second set of positions coinciding with the second subarea (ΩB+);

transmitting a second additional measurement message to the second network access node, wherein the second additional measurement message comprises positions for client devices in the first set of positions coinciding with the first subarea (ΩA+).

6. A first network access node for a wireless communication system, comprising at least one processor and a memory coupled to the at least one processor and storing programming instructions, which when executed by the at least one processor, cause the at least one processor to perform operations comprising:

obtaining a first set of radio measurements and a first set of positions for client devices served by the first network access node in a first service area;

transmitting a first measurement message to a coordinator network node, wherein the first measurement message comprises the first set of radio measurements and the first set of positions;

receiving a first area specification message from the coordinator network node in response to the first measurement message, wherein the first area specification message comprises a first subarea (ΩA+) having positions in the first set of positions affecting resource allocation in a joint resource allocation area (ΩUE), and wherein the joint resource allocation area (ΩUE) comprises positions for client devices for which resource allocation in the first service area creates interference in a second service area of a second network access node, or vice versa;

determining a resource allocation for the first service area based on the first area specification message.

7. The first network access node according to claim 6, wherein the operations further comprise:

receiving a resource allocation message comprising a resource allocation function (L) for the joint resource allocation area (ΩUE) and the joint resource allocation area (ΩUE) from the coordinator node;

determining the resource allocation for the first service area further based on the resource allocation message.

8. The first network access node according to claim 7, wherein the first measurement message further comprises a first set of time stamps associated with at least one of the first set of radio measurements and the first set of positions.

9. The first network access node according to claim 6, wherein the operations further comprise:

receiving a first additional measurement message from the coordinator network node, wherein the first additional measurement message comprises positions in a second set of positions for client devices, served by the second network access node in the second service area, affecting resource allocation in the joint resource allocation area (ΩUE);

determining the resource allocation for the first service area further based on the first additional measurement message.

10. The first network access node according to claim 6, wherein the operations further comprise:

transmitting a first position information message to the second network access node, wherein the first position information message comprises positions for active client devices coinciding with the first subarea (ΩA+).

11. The first network access node according to claim 6, wherein the operations further comprise:

receiving a second position information message from the second network access node, wherein the second position information message comprises positions for active client devices served by the second network access node in the second service area;

determining the resource allocation for the first service area further based on the second position information message.

12. A method performed by a coordinator network node, the method comprising receiving a first measurement message from a first network access node, wherein the first measurement message comprises a first set of radio measurements and a first set of positions for client devices served by the first network access node in a first service area;

receiving a second measurement message from a second network access node, wherein the second measurement message comprises a second set of radio measurements and a second set of positions for client devices served by the second network access node in a second service area;

determining a joint resource allocation area (ΩUE) based on the first measurement message and the second measurement message, wherein the joint resource allocation area (ΩUE) comprises positions for client devices for which resource allocation in the first service area creates interference in the second service area, or vice versa;

determining a first subarea ($\Omega A+$) of the first service area and a second subarea ($\Omega B+$) of the second service area, respectively, based on the first measurement message and the second measurement message, wherein the first subarea ($\Omega A+$) and the second subarea ($\Omega B+$) comprise positions for client devices affecting resource allocation in the joint resource allocation area ($\Omega UE$);

transmitting a first area specification message having the first subarea ($\Omega A+$) to the first network access node;

transmitting a second area specification message having the second subarea ($\Omega B+$) to the second network access node.

13. The method according to claim 12, further comprising:

determining a resource allocation function (L) for the joint resource allocation area ($\Omega UE$) based on the first subarea ($\Omega A+$), the second subarea ($\Omega B+$), and the joint resource allocation area ($\Omega UE$);

transmitting a resource allocation message to the first network access node and the second network access node, wherein the resource allocation message comprises the resource allocation function (L) and the joint resource allocation area ($\Omega UE$).

14. The method according to claim 12, further comprising:

determining an updated first subarea ($\Omega An+$) and an updated second subarea ($\Omega Bn+$) based on the first measurement message and the second measurement message, respectively;

determining an updated resource allocation function (L') for the joint resource allocation area ($\Omega UE$) based on the updated first subarea ($\Omega An+$), the updated second subarea ($\Omega Bn+$), and the joint resource allocation area ($\Omega UE$); and in response determining that a performance comparison of the resource allocation function (L) with the updated resource allocation function (L') is less than a performance threshold value, setting the resource allocation function (L) to the updated resource allocation function (L'), the first subarea ($\Omega A+$) to the updated first subarea ($\Omega An+$), and the second subarea ($\Omega B+$) to the updated second subarea ($\Omega Bn+$).

15. The method according to claim 12, wherein the first measurement message further comprises a first set of time stamps associated with at least one of the first set of radio measurements or the first set of positions;

the second measurement message further comprises a second set of time stamps associated with at least one of the second set of radio measurements or the second set of positions;

the joint resource allocation area ($\Omega UE$), the first subarea ($\Omega A+$), and the second subarea ($\Omega B+$) are determined further based on the first set of time stamps and the second set of time stamps.

16. The method according to claim 12, further comprising:

transmitting a first additional measurement message to the first network access node, wherein the first additional measurement message comprises positions for client devices in the second set of positions coinciding with the second subarea ($\Omega B+$); and transmitting a second additional measurement message to the second network access node, wherein the second additional measurement message comprises positions for client devices in the first set of positions coinciding with the first subarea ($\Omega A+$).

* * * * *